United States Patent [19]
Feldman

[11] Patent Number: 5,884,584
[45] Date of Patent: Mar. 23, 1999

[54] ANIMAL LITTER

[75] Inventor: Penny Feldman, Durango, Colo.

[73] Assignee: Alfa-Pet, Inc., St. Louis, Mo.

[21] Appl. No.: 996,230

[22] Filed: Dec. 22, 1997

[51] Int. Cl.⁶ .................................................. A01K 29/00
[52] U.S. Cl. ............................................................ 119/171
[58] Field of Search ..................................... 119/171, 172, 119/173

[56] References Cited

U.S. PATENT DOCUMENTS

| | | | |
|---|---|---|---|
| 4,727,824 | 3/1988 | Ducharme et al. | 119/171 |
| 4,788,936 | 12/1988 | Billings | 119/171 |
| 4,883,021 | 11/1989 | Ducharme et al. | 119/171 |
| 5,133,296 | 7/1992 | Crawford | 119/171 |
| 5,188,064 | 2/1993 | House | 119/171 |
| 5,195,465 | 3/1993 | Webb et al. | 119/171 |
| 5,207,830 | 5/1993 | Cowan et al. | 119/171 |
| 5,271,355 | 12/1993 | Bilings | 119/171 |
| 5,542,374 | 8/1996 | Palmer, Jr. | 119/171 |

*Primary Examiner*—Thomas Price
*Attorney, Agent, or Firm*—Blackwell Sanders Peper Martin

[57] ABSTRACT

An absorbent material suitable for animal litter includes a mixture of (a) from about 10% to about 65% by weight pine wood; (b) from about 5% to about 60% by weight alfalfa; and/ (c) from about 15% to about 75% by weight poplar wood, preferably aspen.

10 Claims, No Drawings

ANIMAL LITTER

FIELD OF THE INVENTION

This invention relates generally to the field of animal litter mixtures, and, more particularly, to an absorbent material that includes a mixture of pine wood, poplar wood and alfalfa. The absorbent litter material is characterized by a pleasant odor, durability, good absorption, and is especially suitable for use as a small animal litter, which effectively absorbs animal waste materials and neutralizes associated unpleasant odors.

BACKGROUND OF THE INVENTION

Previously, it has been known to use aspen particles, chips, shavings etc as a litter for animals. However, this material has traditionally often been composed of all aspen, without other woods or substances introduced. Further, these 100% aspen litters were composed of essentially all portions of the tree, including the bark. Although such "litters" are suitable for use as horticultural mulch, the inclusion of the tree bark causes an appearance which is considered to be unsightly when the material is used as a litter, and particularly a litter for small animals, such as those which would be kept in a person's home, or for use in places of display, such as pet shops.

Other litter compositions including alfalfa or related forage crops are known for their utility as animal litters which effectively absorb animal waste materials and neutralize associated unpleasant odors. For example, alfalfa has been pelletized with starch, as disclosed in U.S. Pat. No. 3,923,005. Such pellets overcome the disadvantage of earlier pelletized alfalfa by reducing the problem of disintegration of the pellets, which caused the litter material to cling to the animal's feet.

A further improvement of alfalfa pellets was disclosed in U.S. Pat. No. 3,941,090 which discusses pelletizing cedar in combination with alfalfa binders.

U.S. Pat. No. 4,788,936 discloses pelleted bedding for livestock, which bedding includes 4 to 45% by volume of aspen bark, with the balance being a combination of sawdust, ground wood chips and ground lumber. U.S. Pat. No. 5,271,355 discloses absorbent material formed of pelleted poplar wood, preferably aspen, including the tree bark, and peat. Optionally, the material may also include cedar wood.

All of the above references involve absorbent materials that are completely pelletized. However, the process of pelletization is complex and thus expensive. Aspen is especially difficult to pelletize, because it is a hard, dry wood which exacts a toll on the extruding equipment used for the pelletizing process, by causing greater amounts of wear on the equipment parts, resulting in the expense of frequent maintenance and replacement.

SUMMARY OF THE INVENTION

Thus, because of the above less-than-ideal characteristics, which are common in known small animal litter mixtures, it is among the objects of the present invention to provide an absorbent material which is useful as an animal litter particularly well-suited for small household pets, which is simple to prepare, and thus relatively inexpensive, while also being highly absorbent of both liquids and odors and having an aesthetically pleasing appearance.

It has been discovered that a particular mixture of certain known substances results in a litter which, while useful for large animals as well, is surprisingly well-suited for use with small animals, such as the type often considered for household pets, such as guinea pigs, monkeys, mice, gerbils, birds, hamsters, etc. The presently conceived small animal litter is a mixture of alfalfa, optionally in the form of pellets, and pine wood chips, shavings or the like (particularly yellow pine which has been dyed green in color), and, most advantageously, barkless aspen chips, shreds or shavings.

This particular blend of ingredients has a pleasing "natural" green and white appearance and is light-weight, and highly absorbent of odors and fluids. This ability to absorb fluids and odors is particularly high as a relative ratio of fluids and odors per weight unit of the new litter mixture, when compared to known litters. This advantage of the new litter is attainable, in large part, because of the use of aspen and even more especially because of the use of barkless aspen wood, which is unusually lightweight. Thus, the new litter mixture is more pleasant to have in a home environment for use with pets, particularly when the person caring for the animal happens to be a small child or an elderly or other individual who cannot readily lift heavy containers of known pet litters.

The new litter mixture is also well-suited, for example, for pet stores, zoological parks or other displays frequented by many people, some of whom may be especially easily offended by the odor of animal urine or the appearance of soiled cage litter.

Accordingly, in order to accomplish the above goals, the present invention is, briefly, an absorbent material suitable for use as an animal litter and which is composed of a mixture of:

(a) from about 10% to about 65% by weight pine wood;

(b) from about 5% to about 60% by weight alfalfa; and (c) from about 15% to about 75% by weight poplar wood.

Other goals and advantages will be in part apparent and in part pointed out hereinbelow.

BRIEF DESCRIPTION OF THE SEVERAL VIEWS OF THE DRAWINGS

Not applicable.

DETAILED DESCRIPTION OF THE INVENTION

The present invention involves an absorbent material made of a mixture of pine wood, alfalfa and poplar wood.

The pine wood of the present invention is splinters, chips, saw dust, wood particles, pine shavings or other wood waste material. The preferred pine wood is pine shavings. Optionally, all or part of the pine shavings can be dyed, usually green, to provide a more aesthetic appearance. The amount of pine wood in the absorbent material is from about 10% to 65% by weight. The preferred range is from about 10% to about 40% by weight. The most preferred range is from about 15% to about 30% by weight.

The alfalfa of the present invention is optionally, but not necessarily, pelleted, with the size of the pellets in the range of about 0.50 to about 0.05 inches in diameter. Preferably, the pellets of from about 0.20 to about 0.10 inches in diameter. The amount of alfalfa in the absorbent material is from about 5% to 60% by weight. The preferred range is from about 5% to about 40% by weight. The most preferred range is from about 15% to 30% by weight.

The poplar wood of the present invention can be any poplar-type wood, for adequate results. However, the preferred poplar wood is aspen, because of the exceptional absorbency of this particular poplar. The most preferred poplar wood is debarked aspen particles, or pieces, which have greater absorbency than aspen bark, are lighter in weight, and have a more pleasing appearance for a litter, being lighter in color. Aspen is also known to be lower in oil content than other woods and provides a less fertile ground for bacterial growth, thus keep odors in soiled litter to a minimum. The preferred aspen particles are of a large enough size to not adhere to the animal's feet, yet small enough to provide sufficient surface area for enhanced absorbency. The preferred size of the particles is in the range of about 10 to 30 mesh. The most preferred range is from about 15 to 25 mesh. This preferred size is the most well suited for small caged animals.

The preferred range of aspen or other poplar wood in the new animal litter is from about 15% to about 75%. The particularly preferred range of aspen is from about 20% to about 45% by weight.

The absorbent material of the present invention is a mixture of the above three components, aspen, alfalfa and pine. Optionally, components such as cedar wood, deodorants, perfumes, dyes, or additional absorbent components can be added to the absorbent material. However, for purposes of economy, the new litter mixture can used without any additional components, with more than satisfactory results.

The following example is provided as an illustration of a typical embodiment of the product of this invention and is not intended in any way to limit the scope of the invention to the specific constraints therein described.

EXAMPLE

An absorbent material is made of the following components (all components are by weight):

| | |
|---|---|
| 50 parts of pine shavings, dyed green - | 9% |
| 50 parts of pine shavings - | 9% |
| 308 parts of aspen particles - | 57% |
| 133 parts of alfalfa pellets - | 25% |

The aspen particles are formed of debarked aspen wood and 85% of such particles are greater in size than 20 mesh. The alfalfa pellets are 0.187 inch in diameter. Such a mixture will give a highly suitable result for use as a litter for small caged animals in absorbency of both liquids and odors, and is very light in weight.

In view of the foregoing, it will be seen that the several objects of the invention are achieved and other advantages are attained.

Although the foregoing includes a description of the best mode contemplated for carrying out the invention, various modifications are contemplated.

As various modifications could be made in the composition herein described, without departing from the scope of the invention, it is intended that all matter contained in the foregoing description shall be interpreted as illustrative rather than limiting.

What is claimed is:

1. An absorbent material suitable for animal litter comprising a mixture of:

(a) from about 10% to about 65% by weight pine wood;

(b) from about 5% to about 60% by weight alfalfa; and (c) from about 15% to about 75% by weight poplar wood.

2. The absorbent material of claim 1, wherein the alfalfa is pelleted.

3. The absorbent material of claim 2, wherein the poplar wood is aspen wood.

4. The absorbent material of claim 3, wherein the aspen wood is debarked.

5. An absorbent material suitable for animal litter comprising a mixture of:

(a) from about 10% to about 65% by weight pine wood;

(b) from about 10% to about 60% by weight pelleted alfalfa; and (c) from about 15% to about 75% by weight debarked aspen wood particles.

6. The absorbent material of claim 5, wherein the pine wood is pine shavings.

7. The absorbent material of claim 5, wherein the size of the alfalfa pellets is in the range of about 0.50 to about 0.05 inches in diameter.

8. The absorbent material of claim 5, wherein the size of the debarked aspen wood particles is in the range of about 10 to 30 mesh.

9. The absorbent material of claim 6, wherein at least part of the pine shavings is comprised of shavings which have been dyed green.

10. An absorbent material suitable for animal litter comprising a mixture of:

(a) from about 10% to about 65% by weight pine wood shavings;

(b) from about 10% to about 60% by weight pelleted alfalfa wherein the size of the pellets is in the range of about 0.5 to 0.05 inches in diameter; and (c) from about 15% to about 75% by weight debarked aspen wood particles, wherein the size of the particles is in the range of about 10 to 30 mesh.

* * * * *